March 29, 1955 W. T. TAYLOR Re. 23,973
MEANS FOR CONVERTING LIQUID FUEL
Original Filed Jan. 12, 1952
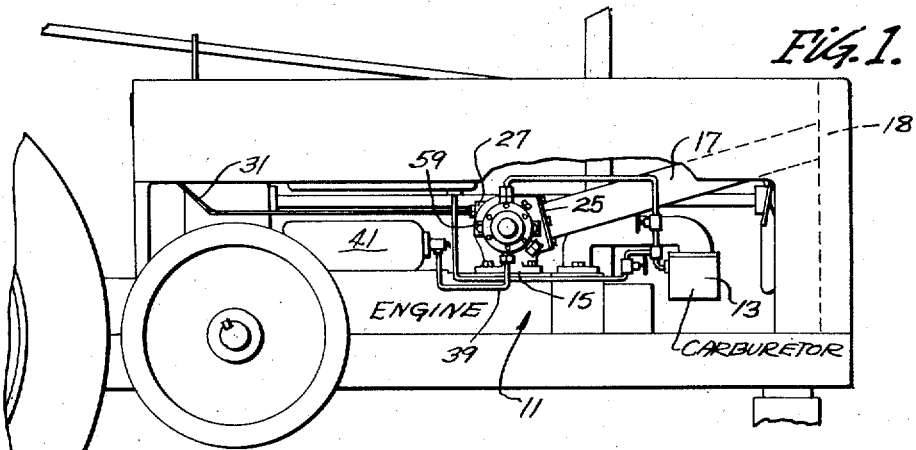
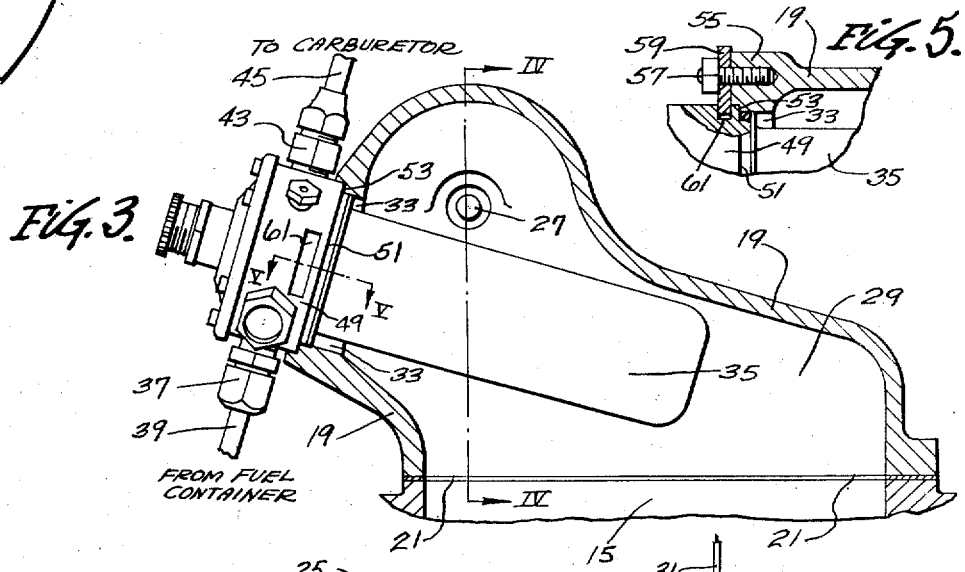
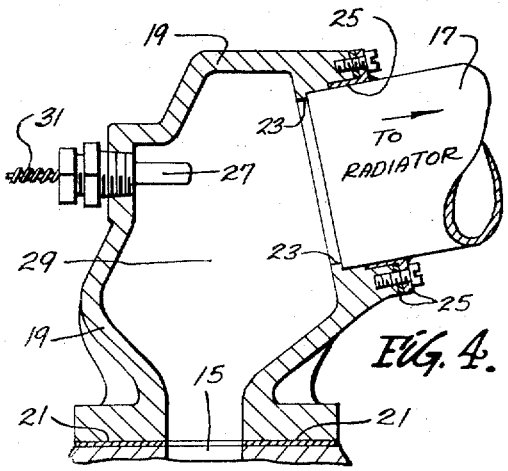
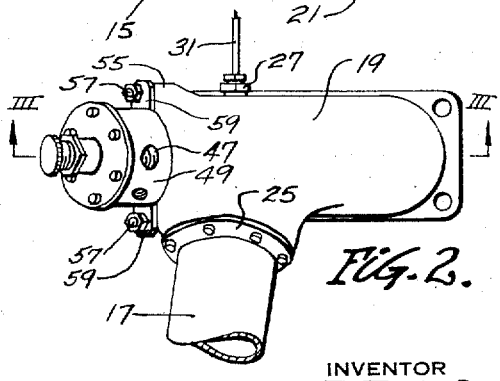
INVENTOR
WILLIAM T. TAYLOR
BY
Weatherford and Weatherford
ATTYS.

United States Patent Office

Re. 23,973

Reissued Mar. 29, 1955

23,973

MEANS FOR CONVERTING LIQUID FUEL

William T. Taylor, Marks, Miss.

Original No. 2,637,173, dated May 5, 1953, Serial No. 266,148, January 12, 1952. Application for reissue July 16, 1954, Serial No. 443,986

13 Claims. (Cl. 62—1)

Matter enclosed in heavy brackets [ ] appears in the original patent but forms no part of this reissue specification; matter printed in italics indicates the additions made by reissue.

This invention relates to means for converting liquid petroleum products, as of the character of propane-butane into a gaseous state for use in connection with an internal combustion engine as a fuel, and particularly relates to means which utilizes to the maximum the engine heat of an internal combustion engine for the purpose of effecting vaporization of such liquid petroleum products.

The principal object of the present invention is to provide means including a chamber interposed directly in the flow line of cooling water from an internal combustion engine to a radiator used in conjunction therewith.

A further object of the invention is to provide such a chamber adapted to receive a removable converter cartridge adapted to receive liquid petroleum products and to discharge same in a gaseous state.

A further object of the invention is to provide means for converting liquid petroleum products adapted for use in conjunction with the cooling water system of internal combustion engines particularly of the type which do not include circulatory pumps.

A further object of the invention is to provide means for removably mounting a cartridge or container in the flow line of engine cooling water; and A further object of the invention is to generally improve the design, construction and efficiency of converters for liquid petroleum products.

The means by which the foregoing and other objects of the present invention are accomplished and the manner of their accomplishment will readily be understood from the following specification upon reference to the accompanying drawings, in which:

Fig. 1 is a side elevational view as of a conventional tractor employing an internal combustion engine upon which is mounted the converter of the present invention.

Fig. 2 is a plan view on an enlarged scale of the converter chamber casing and certain related parts.

Fig. 3 is a transverse sectional view on a further enlarged scale taken as on the line III—III of Fig. 2.

Fig. 4 is a cross sectional view of the chamber taken as on the line IV—IV of Fig. 3; and Fig. 5 is a fragmentary sectional plan view taken as on the line V—V of Fig. 3.

Referring now to the drawings in which the various parts are indicated by numerals, the present invention is particularly adapted for use with a self-propelled vehicle such as a tractor having a conventional internal combustion engine 11, provided with a carburetor 13. The engine includes conventional water cooling system having an upper outlet 15 connected through a hose or pipe 17 to a radiator 18, conventionally forming part of the water system of the carburetor.

Interposed between outlet 15 and hose 17 is a casing 19 fitting upon the upper portion of engine 11 and having an open base 21 in register and communicating with water outlet 15. Casing 19 is provided with a forwardly projecting opening 23 into which hose 17 projects and communicates and is suitably sealed and fastened as by sealing and fastening means 25.

*It will be observed from the drawings that the sealing means 25 provide one form of connecting means for the means for delivering water flow to the cooling means, the delivering means being specifically illustrated here as hose 17 and the cooling means as radiator 18. The present invention is useful with other types of installations which may include other forms of flow delivering means and other forms of water supply cooling means.*

*It will be observed that opening 23 is formed in an upper portion of casing 19 spaced substantially above base 21, and forms the exit opening for receiving upward and forward flow of water introduced into the casing through the open base 21. It further will be seen, particularly from Fig. 2 of the drawings, that the hose connection, while formed in the forward portion of casing 19, is preferably offset toward one side of the casing so as to cause the flow of water between the inlet opening through base 21 toward the outlet opening 23 to travel somewhat diagonally in part across the interior of the casing.*

Opposite from hose opening 23 casing 19 is provided with a suitable threaded aperture adapted to receive a heat indicator unit 27 which projects into the chamber 29, constituting the interior of casing 19. Heat indicator 27 is preferably connected as by connecting means 31 to a suitable gage or indicator, not shown, carried by the tractor.

Casing 19 is further provided with an opening 33, opening from one side of the casing and adapted to receive a converter cartridge 35 which is preferably removably mounted therein.

*The side of casing 19 in which opening 33 is formed is preferably that side toward which the hose connection is laterally offset as described hereinabove. Additionally opening 33 is formed in casing 19 substantially above the level of base 21 and substantially at the level of hose opening 23. The periphery of opening 23 is further preferably disposed in a plane inclined from the vertical so that when a converter cartridge 35 is mounted therein the cartridge extends diagonally downwardly from opening 33.*

Cartridge 35 consists of an elongated imperforate body in which is mounted a coil, not shown, one end of the coil being connected as by a fitting 37 through a line 39 to a suitable container 41 for supplying liquid petroleum products under pressure, and the opposite end of the cartridge enclosed coil is connected through a suitable fitting 43 and line 45 to carburetor 13 so as to deliver fuel from cartridge 35 to carburetor 14.

The fitting 37, 43 are preferably threaded into suitable threaded apertures, as the threaded aperture 47, formed in collar 49 which is of a greater thickness than the body of cartridge 35 and extends outwardly beyond the cartridge to provide a shoulder 51. Preferably cartridge receiving opening 33 is undercut to form an annular shoulder 53 in which, as best shown in Fig. 3, cartridge shoulder 51 snugly fits. Adjacent cartridge receiving opening 33 casing 19 is provided with losses 55 which are bored and preferably threaded to receive suitable screws or other attachment means 57 by which lugs 59 are removably attached to casing 19, the lugs being of a length to project inwardly beyond casing shoulder 53, and as shown in Fig. 5, being spaced from the casing shoulder. Collar 49 is grooved on its opposite sides as at 61, the grooves being of a depth to receive the extending ends of lugs 59, the engagement between lugs 59 and grooves 61 serving to removably fix cartridge 35 in position relative to casing 19.

In applying the device of the present invention to a conventional engine the conventional fitting or adapter by which water hose 17 is connected to water outlet 15 to establish communication between the engine water and the radiator is removed and the casing 19 fixed to engine 11 with casing base opening 21 in register and communication with water outlet 15. Hose 17 is then connected to casing opening 23 by fastening elements 25, reestablishing communication between the water in engine 11 and radiator 18 with chamber 29 of casing 19 being interposed directly in the flow line between the engine block and the radiator. Cartridge 35 may then be positioned in cartridge receiving opening 33, lugs 59 positioned in engagement with collar grooves 61 and fastening of the lugs to bosses 55 by screws 57 effected, thus fixing cartridge 35 to casing 19 with the body of cartridge 35 projecting into chamber 29 overlying a substantial portion of water outlet 15 and directly interposed across the flow line from water outlet 15 to hose 17. Fitting 37 and line 39 are respectively connected to cartridge 35 and fuel container 41 and fitting 43 and line 45 respectively connected to cartridge 35 and carburetor 13.

In the operation of the device, flow of fuel from fuel container 41 through line 39 and fitting 37 into cartridge 35 may be established, utilizing the pressure employed in containers of the character of container 41. The operation of engine 11 establishes engine heat in the water of such engine which flows from water outlet 15 directly into chamber 29, surrounding the body of cartridge 35, thence outwardly through hose 17 to the radiator. Thus the engine heat is delivered immediately into the chamber 29 acting upon the liquid petroleum delivered into cartridge 35 and vaporizing products being accomplished and delivered through fitting 43 and line 45 to carburetor 13. It will be seen that the device of this engine is adaptable for application to water circulatory systems of internal combustion engines, whether such systems are provided with circulating pumps or not, and that the arrangement is such that chamber 29 of casing 19 being positioned directly in and as a part of the flow line between engine 11 and the conventional radiator 18, receives the engine water in its most highly heated condition, greatly increasing the efficiency of such water as a converting medium for use with liquid petroleum products.

*It will be seen that cartridge 35 when mounted in aperture 33 of casing 19 is positioned to extend laterally inwardly of the casing toward the opposite side of the casing and is so positioned as to be supported substantially spaced above the open base of the casing and to intersect, preferably in a diagonally disposed attitude, the upward and forward flow path from the open base to the hose connection.*

And it further will be seen that by the attachment arrangement of the present invention a cartridge 35 may quickly and simply be mounted as in a casing 19 to provide a simple and efficient means for equipping an internal combustion engine with converting means whereby liquid petroleum products may be satisfactorily employed as a fuel supply.

I claim:

1. Means for converting liquid petroleum gas for use with an internal combustion engine having an engine cooling system including a supply of water contained in said engine, an outlet for circulating flow of said supply from said engine, a radiator and a hose for connecting said outlet flow to said radiator; said converting means comprising a casing adapted for seating on said engine, said casing housing a chamber having an open base adapted to be positioned in registering communication with said outlet, a hose connection communicating into said chamber to receive flow therefrom, an annular aperture formed in said casing offset from said hose connection, a shoulder coextensive with and contiguous to said aperture formed in said casing, a converter cartridge having a collar including an annular shoulder, removably mounted in said aperture with said cartridge shoulder seated against said casing shoulder, said collar being grooved adjacent said cartridge shoulder, lug means removably secured to said casing adjacent said aperture, said lug means being of a length to extend across said casing shoulder and engage said collar grooving to anchor said cartridge to said casing, said cartridge when anchored extending into said chamber, and means for introducing liquid petroleum gas into said cartridge for converting action.

2. Means for converting liquid petroleum gas for use with an internal combustion engine having an engine cooling system including a supply of water contained in said engine, an outlet for circulating flow of said supply from said engine, a radiator and a hose for connecting said outlet flow to said radiator; said converting means comprising a casing adapted for seating on said engine, said casing housing a chamber having an open base adapted to be positioned in registering communication with said outlet, a hose connection communicating into said chamber to receive flow therefrom, an aperture formed in said casing offset from said hose connection, a converter cartridge removably mounted in said aperture and seated against said casing, lug means removably secured to said casing adjacent said aperture, said lug means being of a length to extend across said casing aperture, said lug means engaging said cartridge to anchor said cartridge to said casing, said cartridge when anchored extending into said chamber, and means for introducing liquid petroleum gas into said cartridge for converting action.

3. Means for converting liquid petroleum gas for use with an internal combustion engine having an engine cooling system including a supply of water contained in said engine, an outlet for circulating flow of said supply from said engine, a radiator and a hose for connecting said outlet flow to said radiator; said converting means comprising a casing adapted for seating on said engine, said casing housing a chamber having an open base adapted for registering communication with said outlet, a hose connection communicating into said chamber to receive flow therefrom, an aperture formed in said casing offset from said hose connection, a converter cartridge mounted in said aperture against said casing, said cartridge extending into said chamber, and means for introducing liquid petroleum gas into said cartridge for converting action.

4. Means for converting liquid petroleum gas for use with an internal combustion engine having an engine cooling system including a supply of water contained in said engine, an outlet for circulating flow of said supply from said engine, a radiator and a hose for connecting said outlet flow to said radiator; said converting means comprising a casing housing a chamber, said chamber being adapted for communication with said outlet, a hose connection communicating into said chamber to receive flow therefrom, an aperture formed in said casing offset from said hose connection, converter means mounted in said aperture and extending into said chamber.

5. Means for removably mounting a liquid petroleum gas converter for use with an internal combustion engine having an engine cooling system, comprising a casing adapted to be seated on said engine, said casing housing a chamber adapted for communication with said system, an annular aperture formed in said casing, a shoulder coextensive with and contiguous to said aperture formed in said casing, a collar including an annular shoulder formed on said converter, said converter shoulder being seated against said casing shoulder, said collar being grooved adjacent said converter shoulder, lug means removably secured to said casing adjacent said aperture, said lug means being of a length to extend across said casing shoulder, and engaging said collar grooving to anchor said converter to said casing, said converter when anchored extending into said chamber.

6. Means for mounting a liquid petroleum gas converter for use with an internal combustion engine having a water circulating engine cooling system, comprising a casing adapted to be seated on said engine, said casing housing a chamber adapted for communication with said system, an aperture formed in said casing for receiving said converter, a collar formed on said converter, engaging said aperture when said converter is received therein, said collar being grooved, lug means secured to said casing adjacent said aperture, said lug means being of a length to extend across a portion of said aperture and engaging said collar grooving when said collar engages said aperture to anchor said converter to said casing, said converter when anchored extending into said chamber.

*7. Means for converting liquid petroleum gas for use with an internal combustion engine having an engine cooling system including a supply of water contained in said engine, an outlet for circulating flow of said supply from said engine, cooling means and means for delivering said outlet flow to said cooling means; said converting means comprising a casing adapted for seating on said engine, said casing housing a chamber having an open base adapted for registering communication with said outlet, a connection for said delivering means above and forward of said open base, said connection communicating into said chamber to receive flow therefrom, an aperture in one side of said casing above said base and laterally offset from said connection, said aperture communicating into said chamber, converter means mounted in said aperture and extending into said chamber toward the other side of said casing, said converter means extending across said base and being interposed between said base and said connection.*

*8. Means for mounting a liquid petroleum gas converter cartridge for use with an internal combustion engine including a supply of water contained in said engine, an outlet for circulating flow of said supply from said engine, means for cooling the water supply, and means for delivering said outlet flow to said cooling means; said mount-*

*ing means comprising a casing adapted for seating on said engine, said casing having an open base extending substantially from side to side of said casing adapted for registering communication with said outlet, a connection for said delivering means communicating into the front of said casing above said base and adjacent one side of said casing to receive flow from said casing, said open base and said connection forming respectively the entrance to and exit from an upward and forward flow path, an aperture formed in said one side of said casing above said base, the periphery of said aperture being disposed in a plane inclined relative to said base, said aperture being adapted to receive and support a converter cartridge inserted therein to extend diagonally downwardly within said casing toward the other side of said casing in said flow path between said base and said connection.*

*9. Means for mounting a liquid petroleum gas converter cartridge for use with an internal combustion engine including a supply of water contained in said engine, an outlet for circulating flow of said supply from said engine, means for cooling the water supply, and means for delivering said outlet flow to said cooling means; said mounting means comprising a casing adapted for seating on said engine, said casing having an open base extending substantially from side to side of said casing adapted for registering communication with said outlet, a connection for said delivering means communicating into the front of said casing above said base and adjacent one side of said casing to receive flow from said casing, said open base and said connection respectively forming the entrance to and exit from an upward and forward flow path, an aperture formed in said one side of said casing above said base, said aperture being adapted to receive and support a converter cartridge inserted therein to extend within said casing toward the other side of said casing in said flow path between said base and said connection.*

*10. Means for mounting a liquid petroleum gas converter cartridge for use with an internal combustion engine including a supply of water contained in said engine, an outlet for circulating flow of said supply from said engine, water supply cooling means, and means for delivering said outlet flow to said cooling means; said mounting means comprising a casing adapted for seating on said engine, said casing having an open base extending substantially from side to side of said casing adapted for registering communication with said outlet, a connection for said delivering means communicating into the front of said casing above said base to receive flow from said casing, said open base and said connection respectively forming the entrance to and exit from an upward and forward flow path, an aperture formed in one side of said casing above said base, the periphery of said aperture being disposed in a plane inclined relative to said base, said aperture being adapted to receive and support a converter cartridge inserted therein to extend diagonally downwardly within said casing toward the other side of said casing in said flow path between said base and said connection.*

*11. Means for mounting a liquid petroleum gas converter cartridge for use with an internal combustion engine including a supply of water contained in said engine, an outlet for circulating flow of said supply from said engine, water supply cooling means, and means for delivering said outlet flow to said cooling means; said mounting means comprising a casing adapted for seating on said engine, said casing having an open base extending substantially from side to side of said casing adapted for registering communication with said outlet, a connection for said delivering means communicating into the front of said casing above said base to receive flow from said casing, said open base and said connection respectively forming the entrance to and exit from an upward and forward flow path, an aperture formed in one side of said casing above said base, said aperture being adapted to receive and support a converter cartridge inserted therein to extend within said casing toward the other side of said casing in said flow path between said base and said connection.*

*12. Means for mounting a liquid petroleum gas converter cartridge for use with an internal combustion engine including a supply of water contained in said engine, an outlet for circulating flow of said supply from said engine, water supply cooling means, and means for delivering said outlet flow to said cooling means; said mounting means comprising a casing adapted for seating on said engine, said casing having an open base extending substantially from side to side of said casing adapted for registering communication with said outlet, a connection for said delivering means communicating into the front of said casing above said base to receive flow from said casing, said open base and said connection respectively forming the entrance to and exit from an upward and forward flow path, an aperture formed in one side of said casing above said base a distance substantially equal to the distance of said connection above said base, said aperture being adapted to receive and support a converter cartridge inserted therein to extend within said casing toward the other side of said casing in said flow path between said base and said connection.*

*13. Means for mounting a liquid petroleum gas converter cartridge for use with an internal combustion engine including a supply of water contained in said engine, outlet means for circulating flow of said supply from said engine, water supply cooling means, and means for delivering said outlet flow to said cooling means; said mounting means comprising a casing housing a chamber for interposing in said circulating flow, said casing being open at one end for registering communication of said chamber with said outlet means, a connection for said delivering means communicating into the front of said chamber above said open end to receive flow from said chamber, said open end and said connection respectively forming the entrance to and exit from an upward and forward flow path through said chamber, an aperture formed in one side of said casing above said open end, said aperture being adapted to receive and support a converter cartridge inserted therein to extend within said chamber toward the other side of said casing in said flow path between said open end and said connection.*

References Cited in the file of this patent or the original patent

UNITED STATES PATENTS

| | | |
|---|---|---|
| 1,318,265 | Clemmensen | Oct. 7, 1919 |
| 2,073,276 | Ensign | Mar. 9, 1937 |
| 2,231,605 | Stephenson et al. | Feb. 11, 1941 |
| 2,298,214 | Jones | Oct. 6, 1942 |